United States Patent
Gokan et al.

(10) Patent No.: US 8,448,770 B2
(45) Date of Patent: May 28, 2013

(54) MULTIPLATE CLUTCH

(75) Inventors: Yoshitsugu Gokan, Wako (JP);
Yoshinobu Shiomi, Wako (JP);
Hirotaka Kawatsu, Wako (JP);
Katsumi Sato, Wako (JP); Taito Kobayashi, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 315 days.

(21) Appl. No.: 12/826,152

(22) Filed: Jun. 29, 2010

(65) Prior Publication Data

US 2011/0024256 A1 Feb. 3, 2011

(30) Foreign Application Priority Data

Jul. 31, 2009 (JP) ................................. 2009-179282

(51) Int. Cl.
*F16D 43/21* (2006.01)
*F16D 13/04* (2006.01)

(52) U.S. Cl.
USPC ...................... 192/54.5; 192/70.23; 192/93 A (58) Field of Classification Search
USPC ..................... 192/54.1, 54.5, 70.23
See application file for complete search history.

(56) References Cited

U.S. PATENT DOCUMENTS

| | | | | |
|---|---|---|---|---|
| 3,580,229 A | * | 5/1971 | May .......................... | 123/41.12 |
| 4,213,521 A | * | 7/1980 | Modersohn ................. | 192/18 R |
| 5,080,214 A | * | 1/1992 | Fossum ...................... | 192/84.92 |
| 5,375,687 A | * | 12/1994 | Inoue et al. ................ | 192/35 |
| 7,025,151 B2 | * | 4/2006 | Hehli et al. ................. | 173/176 |
| 2008/0029332 A1 | * | 2/2008 | Gokan et al. ................ | 180/383 |

FOREIGN PATENT DOCUMENTS

| | | |
|---|---|---|
| DE | 10 2009 032 862 A1 | 4/2010 |
| EP | 1 916 434 A1 | 4/2008 |
| JP | 2-150517 A | 6/1990 |
| JP | 2005-325993 A | 11/2005 |
| JP | 2008-38954 A | 2/2008 |
| JP | 2008-039082 A | 2/2008 |
| WO | 98/40638 A1 | 9/1998 |

\* cited by examiner

*Primary Examiner* — David D Le
*Assistant Examiner* — Stacey Fluhart
(74) *Attorney, Agent, or Firm* — Westerman, Hattori, Daniels & Adrian, LLP (57) ABSTRACT

A multiplate clutch has an assistive cam mechanism comprising a first cam member having a first recess and a second cam member having a first tooth inserted in the first recess, wherein at least one of abutment surfaces of the first recess and the first tooth in a power transmitting state for transmitting power from an input member to an output member comprises a slanted surface for increasing an urging force of a clutch spring upon acceleration in the power transmitting state. The multiplate clutch is prevented from being connected abruptly while sufficiently reducing a load with which to operate the clutch. The angle of intersection between the slanted surfaces and a plane perpendicular to a clutch central axis is set to a range from 80 degrees to 85 degrees.

17 Claims, 7 Drawing Sheets

MULTIPLATE CLUTCH

TECHNICAL FIELD

A multiplate clutch is disclosed including a clutch outer member coupled to an input member, a clutch inner member coupled to an output member, a plurality of drive friction plates engaging the clutch outer member, a plurality of driven friction plates alternately superposed on the drive friction plates and engaging the clutch inner member, a sandwiching presser plate sandwiching the drive friction plates and the driven friction plates between itself and the clutch inner member, a clutch spring for urging the clutch inner member or the sandwiching presser plate in a direction to sandwich the drive friction plates and the driven friction plates under pressure between the clutch inner member and the sandwiching presser plate, and an assistive cam mechanism comprising a first cam member having a first recess and a second cam member having a first tooth inserted in the first recess, wherein at least one of abutment surfaces of the first recess and the first tooth in a power transmitting state for transmitting power from the input member to the output member comprises a slanted surface for increasing an urging force of the clutch spring upon acceleration in the power transmitting state.

BACKGROUND OF THE INVENTION

There is known from Japanese Patent Laid-open No. Hei 2-150517 a so-called assistive slipper clutch having a cam mechanism for pulling in a clutch cam member and increasing the urging force of a clutch spring to increase the pressing forces of drive friction plates and driven friction plates upon acceleration in a power transmitting state and pushing out the clutch cam member and reducing the urging force of the clutch spring to reduce the pressing forces of the drive friction plates and the driven friction plates upon deceleration.

SUMMARY OF THE INVENTION

On a vehicle which requires a large-size multiplate clutch to meet an increased engine output, the spring load of a clutch spring has to be set to a large level, resulting in a large load with which to operate the clutch. As disclosed in Japanese Patent Laid-open No. Hei 2-150517, therefore, it is desirable to apply a technology for bringing slanted surfaces of teeth and recesses into abutment against each other thereby to pull in a clutch cam member to increase the pressing forces of drive friction plates and driven friction plates for obtaining an assistive effect upon acceleration. However, although the load with which to operate the clutch can sufficiently be reduced by the pulling force, if an excessive pulling force is generated, then since it is necessary to prevent the clutch from being connected abruptly, the slanted surfaces need to be set to angles for a balanced pulling force. For setting slanted surface angles, it is necessary to prepare cam mechanisms having various angles and test the cam mechanisms to various requirements. Therefore, a considerable period of time will be needed until optimum angles are determined.

Tests of various requirements for angles of slanted surfaces have been conducted, and it has been found that there is an optimum angular range capable of preventing the clutch from being connected abruptly while sufficiently reducing the load with which to operate the clutch.

In view of the above, a multiplate clutch is provided which is prevented from being connected abruptly while sufficiently reducing the load with which to operate the clutch.

There is provided in accordance with a first feature a multiplate clutch including a clutch outer member coupled to an input member, a clutch inner member coupled to an output member, a plurality of drive friction plates engaging the clutch outer member, a plurality of driven friction plates alternately superposed on the drive friction plates and engaging the clutch inner member, a sandwiching presser plate sandwiching the drive friction plates and the driven friction plates between itself and the clutch inner member, a clutch spring for urging the clutch inner member or the sandwiching presser plate in a direction to sandwich the drive friction plates and the drive friction plates under pressure between the clutch inner member and the sandwiching presser plate, and an assistive cam mechanism including a first cam member having a first recess and a second cam member having a first tooth inserted in the first recess, wherein at least one of abutment surfaces of the first recess and the first tooth in a power transmitting state for transmitting power from the input member to the output member includes a slanted surface for increasing an urging force of the clutch spring upon acceleration in the power transmitting state, characterized in that the angle of intersection between the slanted surface and a plane perpendicular to a clutch central axis is set to a range from 80 degrees to 85 degrees.

According to a second feature, in addition to the first feature, of walls surrounding the first recess, a particular wall with the slanted surface thereon is raised from a surface surrounding at least the particular wall.

According to a third feature, in addition to the first or second feature, the multiplate clutch further includes a back torque limiter mechanism including a third cam member having a second recess and a fourth cam member having a second tooth inserted in the second recess, wherein at least one of abutting surfaces of the second recess and the second tooth includes a slanted surface for reducing urging force of the clutch spring upon an increase in a back torque in a back torque transmitting state for transmitting the back torque from the output member to the input member, and the angle of intersection between the slanted surface on the at least one of the abutting surfaces of the second recess and the second tooth and a plane perpendicular to the clutch central axis is identical to the angle of intersection of the slanted surface of the assistive cam mechanism.

According to a fourth feature, in addition to the second or third feature, the multiplate clutch is of a wet type, wherein the first and second recesses have open outer ends along radial directions of the first and third cam members.

According to a fifth feature, in addition to the third feature, the first and third cam members are coaxially fixed to the output member, and at least one of the first and second recesses are disposed at equal spaced intervals in circumferential directions of the first and third cam members.

According to a sixth feature, in addition to any one of the third through fifth features, a single central cam is fixed to the output member to function as the first and third cam members, and the first recess which is open on one side of the central cam in an axial direction of the output member and the second recess which is open on another side of the central cam in an axial direction of the output member are defined in the central cam at the same position in the axial direction.

According to a seventh feature, in addition to the sixth feature, the central cam has a hollow cylindrical boss fixed to the output member and a flange integral with the hollow cylindrical boss and extending radially outwardly from an axially intermediate portion of the boss, the flange including a portion as a flat plate extending along a plane perpendicular to an axis of the output member, the flat plate being joined to open ends of a plurality of the second recesses.

According to an eighth feature, in addition to the seventh feature, the first recess is defined between first and second walls projecting from one side of the flat plate, the second recess is defined by third and fourth walls projecting from the one side of the flat plate and a joint wall integrally joining projecting ends of the third and fourth walls, and the one side of the flat plate is arcuately concave between the first and third walls and between the second and fourth walls.

The main shaft according to an embodiment corresponds to the output member, and the primary driven gear according to the embodiment corresponds to the input member. The pressure bearing plate according to the embodiment corresponds to the sandwiching presser plate, and the central cam according to the embodiment corresponds to the first and third cam members. The assistive cam according to the embodiment corresponds to the second cam member, and the slipper cam according to the embodiment corresponds to the fourth cam member.

According to the first feature, since the angle of intersection between the slanted surface of at least one of abutting surfaces of the first recess and the first tooth and the plane perpendicular to the clutch central axis is set to a range from 80 degrees to 85 degrees, the multiplate clutch is capable of making the startability of the vehicle and the assistive effect compatible with each other. Specifically, if the angle of intersection is smaller than 80 degrees, then the pressing force generated by the assistive cam mechanism for connecting the clutch becomes excessive to connect the clutch abruptly, adversely affecting the startability of the vehicle, and if the angle of intersection is greater than 85 degrees, then no effective pressing force is generated, and the ability of the assistive cam mechanism to reduce the clutch operating load is reduced. In the multiplate clutch with the assistive cam mechanism the angle of intersection of the slanted surface is set to the above range to produce an effective assistive force while satisfying the startability. Compared with the background art which has required a considerable period of time to set an optimum angle, it is possible to achieve an optimum angle through a test for various requirements in a reduced period and reduce the number of design man-hours.

According to the second feature, the wall with the slanted surface thereon is raised from surfaces surrounding the wall. Therefore, the slanted surface maintains a required area while at the same time the first cam member is reduced in weight.

According to the third feature, the angle of intersection between the slanted surface in the back torque limiter mechanism for reducing the urging force of the clutch spring upon an increase in the back torque and the plane perpendicular to the clutch central axis is identical to the angle of intersection of the slanted surface of the assistive cam mechanism, making it possible for the assistive cam mechanism and the back torque limiter mechanism to share components. Therefore, dedicated components can be reduced for a reduction in the cost.

According to the fourth feature, the first and second recesses in the wet-type multiplate clutch have open outer ends in the radial directions of the central cam. Since lubricating oil can thus be well discharged from the first and second recesses, the assistive cam mechanism and the back torque limiter mechanism are prevented from being adversely affected in operation by any excessive lubricating oil remaining in the first and second recesses.

According to the fifth feature, since at least one of the first and second recesses are disposed at equal spaced intervals in the circumferential directions of the first and third cam members which are coaxially fixed to the output member, forces generated when at least one of the second and fourth cam members is brought into abutment are distributed equally circumferentially by the first and third cam members, allowing the cam mechanism to operate reliably.

According to the sixth feature, the single central cam which functions as the first and third cam members is fixed to the output member, resulting in a reduction in the number of components and a reduced space in which the first and third cam members are disposed. Moreover, since the first recess and the second recess are defined in the central cam at the same position in the axial directions of the output member, the space along the axial directions of the output member for placing the first and second recesses therein is reduced, making the assistive cam mechanism and the back torque limiter mechanism compact.

According to the seventh feature, the flat plate which serves as part of the flange of the central cam and extends along the plane perpendicular to the axis of the output member is joined to the open end of the second recess. Consequently, the open end of the second recess which serves as part of the back torque limiter mechanism on which relatively large forces are applied are reinforced by the flat plate.

According to the eighth feature, one side of the flat plate is of an arcuately concave shape between the first recess and the second recess. Accordingly, joints between the walls which provide the circumferentially opposite sides of the first recess and the second recess and the flat plate can be curved and thick, and hence of increased mechanical strength.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
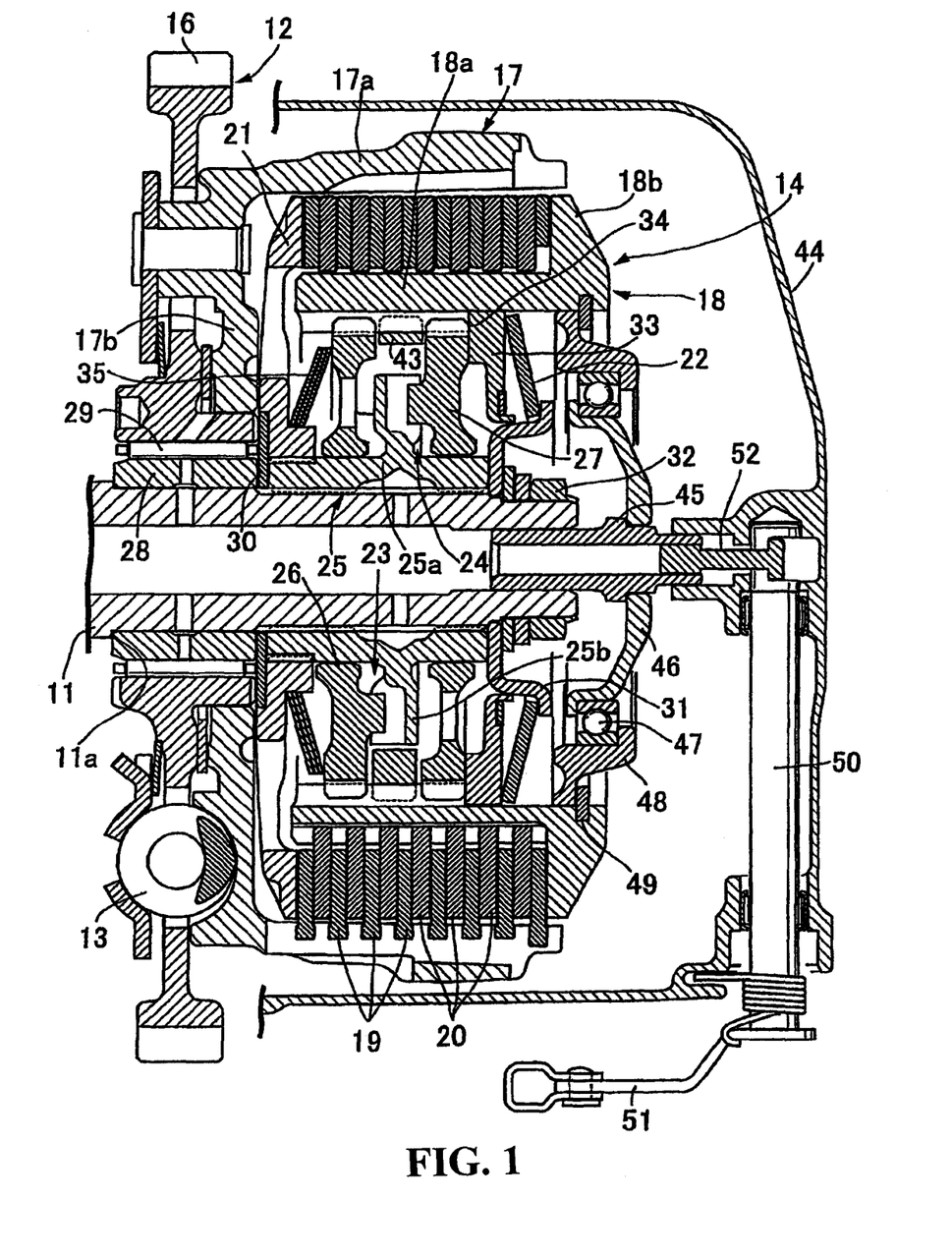
FIG. 1 is a cross-sectional view of a multiplate clutch.

An embodiment of the present invention will be described below with reference to FIGS. 1 through 6. As shown in FIG. 1, a primary speed reducer 12, a damper spring 13, and a multiplate clutch 14 are interposed between the crankshaft (not shown) of an engine mounted on a motorcycle, for example, and a main shaft 11 of a gear transmission (not shown). The primary speed reducer 12 comprises a primary drive gear (not shown) mounted on the crankshaft and a primary driven gear 16 held in mesh with the primary drive gear. The primary driven gear 16 is relatively rotatably supported on the main shaft 11.

The multiplate clutch 14, which is of the wet type, comprises a clutch outer member 17 coupled to the primary driven gear 16 as an input member by the damper spring 13, a clutch inner member 18 having a hollow cylindrical portion 18a coaxially disposed in the clutch outer member 17 and a pressing plate portion 18b integrally joined to an end of the hollow cylindrical portion 18a, a plurality of drive friction plates 19 relatively nonrotatably engaging the clutch outer member 17, a plurality of driven friction plates 20 alternating with the drive friction plates 19 and relatively nonrotatably engaging the hollow cylindrical portion 18a of the clutch inner member 18, a pressure bearing plate 21 as a sandwiching presser plate fixed to the main shaft 11 as an output member and sandwiching the drive friction plates 19 and the driven friction plates 20 between itself and the pressing plate portion 18b, a clutch spring 22 for urging the clutch inner member 18 in a direction to sandwich the drive friction plates 19 and the driven friction plates 20 under pressure between the clutch inner member 18 and the pressure bearing plate 21, an assistive cam mechanism 23 for increasing the urging force of the clutch spring 22 upon acceleration in a power transmitting state for transmitting power from the primary driven gear 16 to the main shaft 11, and a back torque limiter mechanism 24 for reducing the urging force of the clutch spring 22 upon an increase in a back torque in a back torque transmitting state for transmitting the back torque from the main shaft 11 to the primary driven gear 16.

The clutch outer member 17 has a hollow cylindrical portion 17a coaxially surrounding the hollow cylindrical portion 18a of the clutch inner member 18, and an end wall 17b integrally joined to a side end of the hollow cylindrical portion 17a near the primary driven gear 16. The clutch outer member 17 is of a cup shape which is open away from the primary driven gear 16. The drive friction plates 19 have outer circumferential edges axially movably, but relatively nonrotatably, engaging the hollow cylindrical portion 17a.

The main shaft 11 has an annular step 11a on its outer circumferential surface in a region corresponding to the primary speed reducer 12, the annular step 11a facing the multiplate clutch 14. A hollow cylindrical sleeve 28 fitted over the main shaft 11 has an end held against the annular step 11a remotely from the multiplate clutch 14. A needle bearing 29 is interposed between an outer circumferential surface of the sleeve 28 and an inner circumferential surface of the primary driven gear 16.

A central cam 25 which functions as a first cam member that is part of the assistive cam mechanism 23 and also functions as a third cam member that is part of the back torque limiter mechanism 24 is disposed radially inwardly of the hollow cylindrical portion 18a. The central cam 25 has a hollow cylindrical boss 25a splined to the outer circumferential surface of the main shaft 11 and a flange 25b integral with the hollow cylindrical boss 25a and extending radially outwardly from an axially intermediate portion of the boss 25a in a plane perpendicular to the axis of the main shaft 11.

The pressure bearing plate 21 is of a disc shape as shown in FIG. 1 and has an inner circumferential portion splined to the outer circumferential surface of an end of the boss 25a near the primary speed reducer 12 and fixed to the boss 25a by being sandwiched between the boss 25a and a holder plate 30 which is sandwiched between the end of the boss 25a near the primary speed reducer 12 and the sleeve 28.

A nut 32 is threaded over an end of the main shaft 11 with an annular spring retainer 31 sandwiched between the nut 32 and an end of the boss 25a of the central cam 25. When the nut 32 is tightened, the sleeve 28, the holder plate 30, the boss 25a of the central cam 25, and the spring retainer 31 are sandwiched between the annular step 11a and the nut 32. Since the boss 25a is splined to the outer circumferential surface of the main shaft 11, the central cam 25 and the pressure bearing plate 21 are fixed to the main shaft 11.

The clutch spring 22 comprises a disc spring disposed between the spring retainer 31 fixed to the main shaft 11 and an annular spring retainer 33 held in slidable engagement with the hollow cylindrical portion 18a of the clutch inner member 18. The clutch spring 22 serves to press the spring retainer 33 against an annular step 34 which is disposed on an inner circumferential surface of the hollow cylindrical portion 18a and bears the spring retainer 33 remotely from the clutch spring 22. Therefore, the clutch inner member 18 is urged by the clutch spring 22 in a direction to displace the pressing plate portion 18b toward the pressure bearing plate 21, i.e., in a direction to bring the drive friction plates 19 and the driven friction plates 20 into frictional engagement thereby to connect the multiplate clutch 14.

The assistive cam mechanism 23 serves to move the clutch inner member 18 in the direction to displace the pressing plate portion 18b toward the pressure bearing plate 21 depending on an increase in the drive power that is input from the primary driven gear 16. The assistive cam mechanism 23 comprises the central cam 25 fixed as the first cam member to the main shaft 11, and an assistive cam 26 as a second cam member splined to the hollow cylindrical portion 18a of the clutch inner member 18 in confronting relation to one side of the flange 25b of the central cam 25. The back torque limiter mechanism 24 serves to move the clutch inner member 18 in a direction to displace the pressing plate portion 18b away from the pressure bearing plate 21 depending on an increase in the back torque from the main shaft 11. The back torque limiter mechanism 24 comprises the central cam 25 which functions as the first cam member and also as the third cam member, and a slipper cam 27 as a fourth cam member splined to the hollow cylindrical portion 18a of the clutch inner member 18 in confronting relation to the other side of the flange 25b of the central cam 25.

The assistive cam 26 is splined to the hollow cylindrical portion 18a of the clutch inner member 18 between the flange 25b of the central cam 25 and the pressure bearing plate 21. A disc spring 35 for urging the assistive cam 26 in a direction to move toward the flange 25b of the central cam 25 is interposed between the assistive cam 26 and the pressure bearing plate 21.

The slipper cam 27 is splined to the hollow cylindrical portion 18a of the clutch inner member 18 between the flange 25b of the central cam 25 and the annular spring retainer 33 that is slidably fitted in the hollow cylindrical portion 18a of the clutch inner member 18. Since the clutch spring 22 is disposed between the annular spring retainer 31 fixed to the main shaft 11 and the spring retainer 33, the slipper cam 27 is restricted by the spring retainer 33 against axial movement in a direction away from the flange 25b of the central cam 25.

Figure 2:
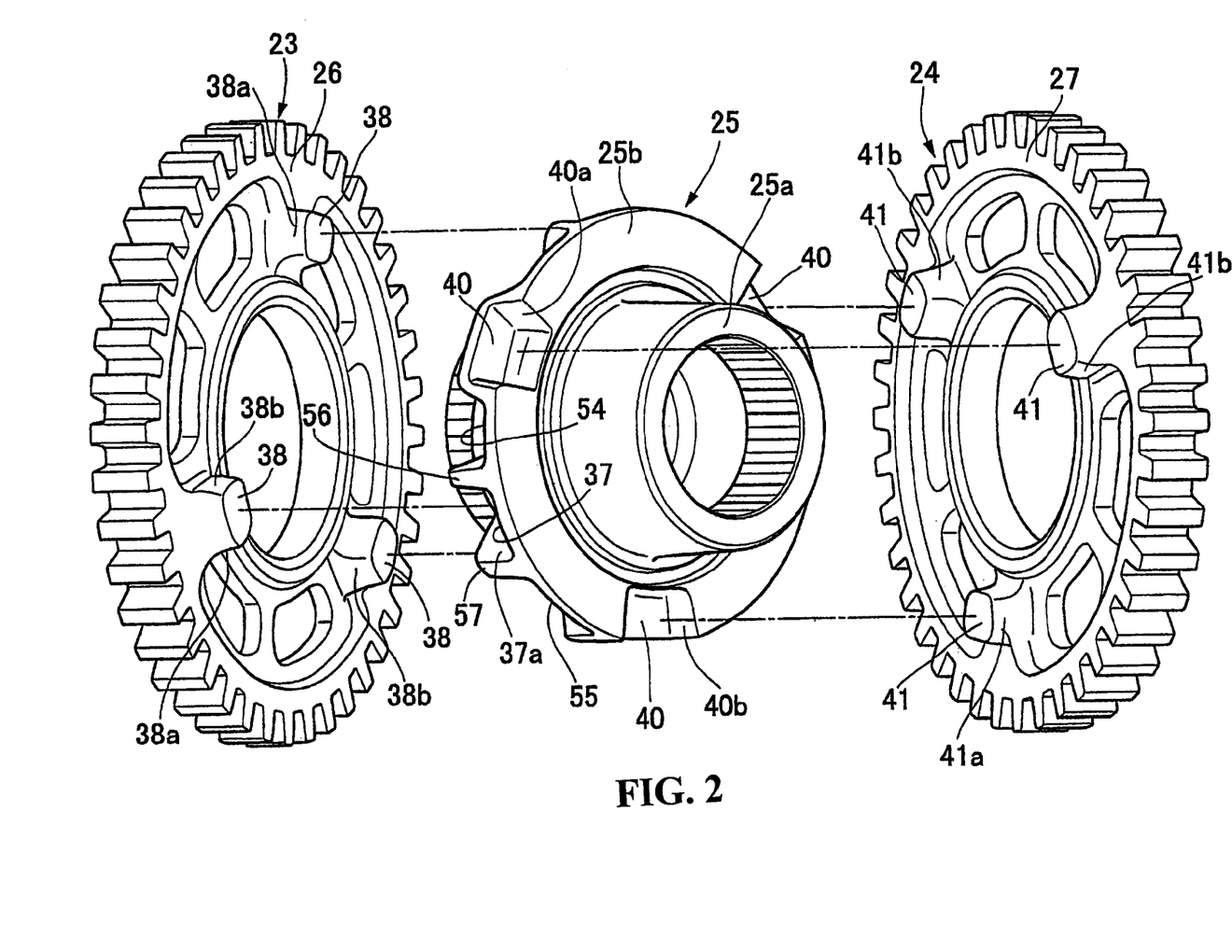
FIG. 2 is an exploded perspective view of a central cam, an assistive cam, and a slipper cam.
Figure 3:
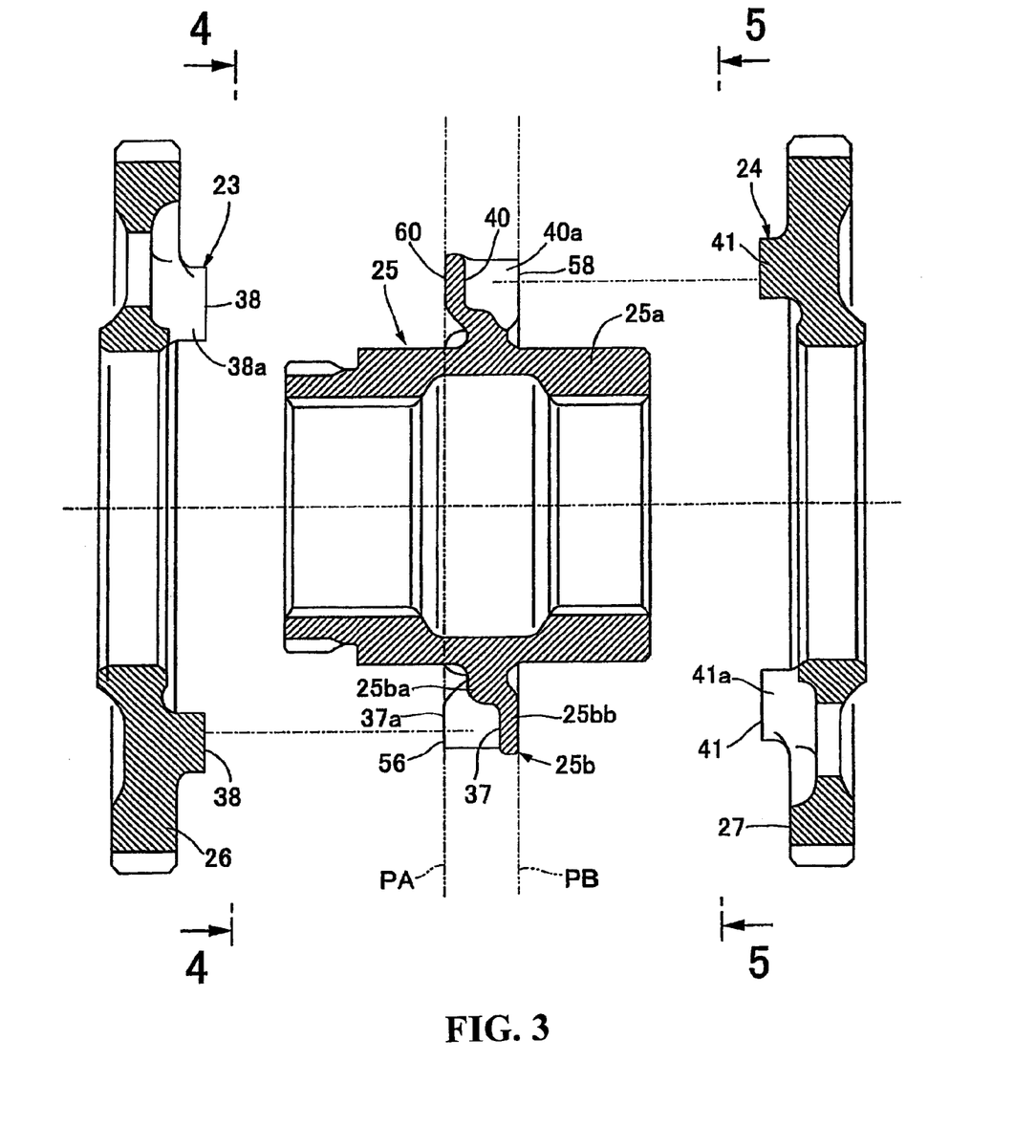
FIG. 3 is an exploded vertical cross-sectional view of the central cam, the assistive cam, and the slipper cam.
Figure 4:
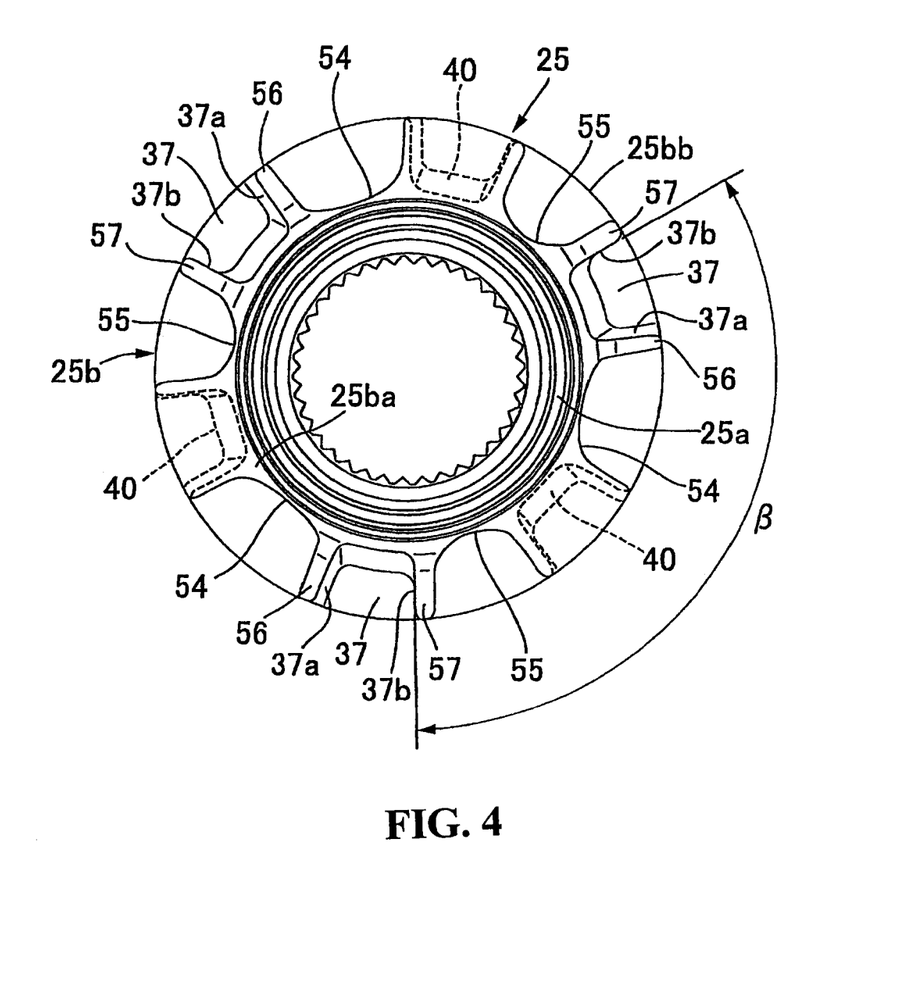
FIG. 4 is a view taken from line 4-4 of FIG. 3.

As also shown in FIGS. 2 through 4, in the assistive cam mechanism 23, the assistive cam 26 has a plurality of first teeth 38 inserted respectively in a plurality of first recesses 37 defined in the one side of the flange 25b of the central cam 25.

Figure 5:
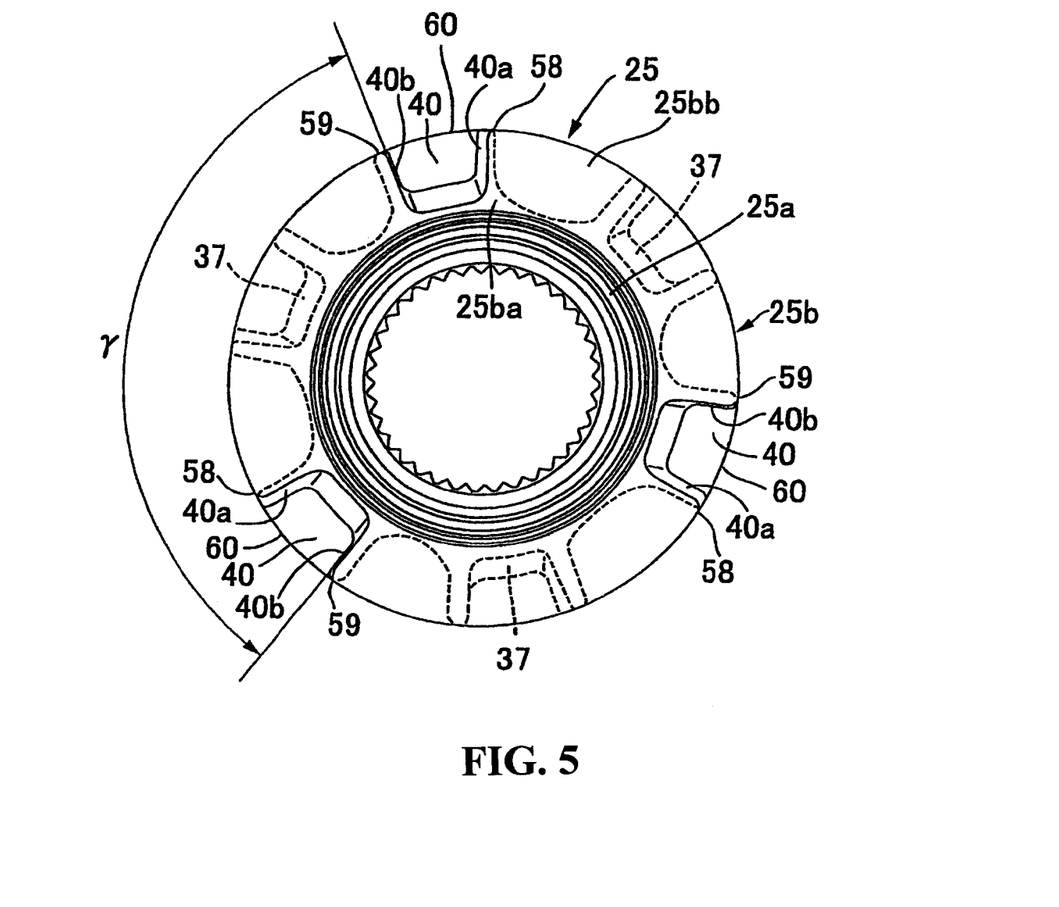
FIG. 5 is a view taken from line 5-5 of FIG. 3.

As also shown in FIG. 5, in the back torque limiter mechanism 24, the slipper cam 27 has a plurality of second teeth 41 inserted respectively in a plurality of second recesses 40 defined in the other side of the flange 25b of the central cam 25.

Figure 6:
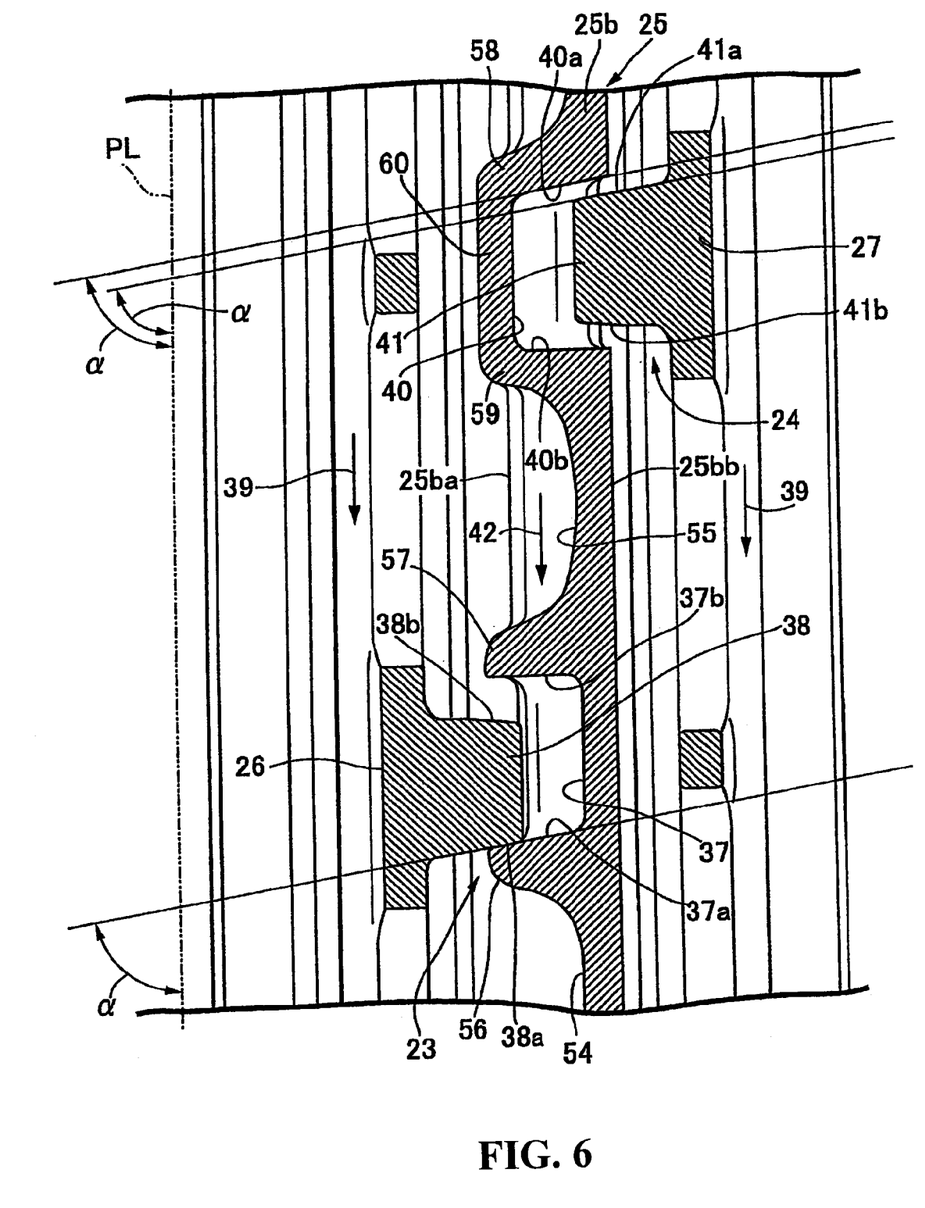
FIG. 6 is a cross-sectional view showing a circumferential expansion of a portion of an assistive cam mechanism and a back torque limiter mechanism.

As also shown in FIG. 6, the flange 25b of the central cam 25 has a ring portion 25ba projecting radially outwardly from an outer circumferential surface of the boss 25a and a flat plate 25bb extending radially outwardly from an end of the ring portion 25ba near the slipper cam 27 along a plane perpendicular to the axis of the main shaft 11.

The first recesses 37 are defined between first and second walls 56 and 57 confronting each other at spaced intervals in the circumferential directions of the central cam 25 and projecting from one side of the flat plate 25bb toward the assistive cam 26, the first and second walls 56 and 57 having inner ends in a radial direction of the central cam 25 which are joined to the ring portion 25ba. The first recesses 37 are open toward the assistive cam 26 and have outer ends which are open in a radial direction of the central cam 25. The first recesses 37, e.g., three first recesses 37, are defined in the one side of the flange 25b of the central cam 25.

The second recesses 40 are defined by third and fourth walls 58 and 59 confronting each other at spaced intervals in the circumferential directions of the central cam 25 and projecting from the one side of the flat plate 25bb toward the assistive cam 26, the third and fourth walls 58 and 59 having inner ends in a radial direction of the central cam 25 which are joined to the ring portion 25ba, and joint walls 60 integrally joining the projecting ends of the walls 58 and 59 and joined to the ring portion 25ba. The second recesses 40 are open toward the slipper cam 27 and have outer ends which are open in a radial direction of the central cam 25. The second recesses 40, e.g., three second recesses 40, are defined in the other side of the flange 25b of the central cam 25. The flat plate 25bb of the flange 25b is joined to the open ends of the second recesses 40.

At least one group of the first recesses 37, e.g., three first recesses 37, and the second recesses 40, e.g., three second recesses 40, i.e., both of the first recesses 37 and the second recesses 40 in the present embodiment, are disposed at equal spaced intervals in the circumferential directions of the central cam 25. The first recesses 37 are disposed at equal spaced intervals in the circumferential directions of the central cam 25 with a central angle $\beta$ therebetween, and the second recesses 40 are disposed at equal spaced intervals in the circumferential directions of the central cam 25 with a central angle $\gamma$ therebetween, $\beta=\gamma$. The second recesses 40 are positioned between the first recesses 37.

The first recesses 37 and the second recesses 40 are defined in the flange 25b of the central cam 25 at the same position in the axial directions of the main shaft 11. The projecting ends, near the assistive cam 26, of the first walls 56 and the second walls 57 which provide both sides of the first recesses 37 in the circumferential directions, and outer surfaces of the joint walls 60 which serve as closed ends of the second recesses 40 are present in a first plane PA perpendicular to the axis of the main shaft 11. Outer surfaces of the flat plate 25bb which serve as closed ends of the first recesses 37 and the projecting ends, near the slipper cam 27, of the third walls 58 and the fourth walls 59 which provide both sides of the second recesses 40 in the circumferential directions are present in a second plane PB perpendicular to the axis of the main shaft 11.

As shown in FIG. 6, when the clutch inner member 18 rotates in the direction indicated by the arrows 39 while the power is being transmitted from the primary driven gear 16 to the main shaft 11 through the multiplate clutch 14 which is connected, front side surfaces of the first teeth 38 along the rotating direction 39 are held in abutment against front side surfaces of the first recesses 37 along the rotating direction 39, i.e., inner side surfaces of the first walls 56. In this state, at least one of the groups of the abutting surfaces of the first recesses 37 and the first teeth 38, i.e., both the abutting surfaces of the first recesses 37 and the first teeth 38 in the present embodiment, serve as slanted surfaces 37a and 38a which are inclined forwardly along the rotating direction 39 toward the assistive cam 26.

When a torque change for acceleration occurs while the torque is being transmitted from the primary driven gear 16 to the main shaft 11, the slanted surfaces 38a of the first teeth 38 of the assistive cam 26 abut against the slanted surfaces 37a of the first recesses 37 in the flange 25b of the central cam 25. The flange 25b applies a force to the assistive cam 26 tending to move the assistive cam 26 away from the flange 25b of the central cam 25, reducing the opposite urging force which has been applied from the disc spring 35 in a direction to cancel out the urging force of the clutch spring 22. The urging force of the clutch spring 22 becomes fully effective, increasing the compressive force on the drive friction plates 19 and the driven friction plates 20.

When the central cam 25 rotates in the direction indicated by the arrow 42 while the back torque is being transmitted from the main shaft 11 to the primary driven gear 16 through the multiplate clutch 14 which is connected, rear side surfaces of the second recesses 40 along the rotating direction 42 are held in abutment against rear side surfaces of the second teeth 41 along the rotating direction 42, i.e., inner side surfaces of the third walls 58. In this state, at least one of the groups of the abutting surfaces of the second recesses 40 and the second teeth 41, i.e., both the abutting surfaces of the second recesses 40 and the second teeth 41 in the present embodiment, serve as slanted surfaces 40a and 41a which are inclined rearwardly along the rotating direction 42 toward the slipper cam 27.

When a back torque increase occurs while the back torque is being transmitted, the slanted surfaces 40a of the second recesses 40 in the flange 25b of the central cam 25 abut against the slanted surfaces 41a of the second teeth 41 of the slipper cam 27. The flange 25b applies a force to the slipper cam 27 tending to move the slipper cam 27 away from the flange 25b of the central cam 25, reducing the urging force of the clutch spring 22. The compressive force on the drive friction plates 19 and the driven friction plates 20 is now reduced.

An angle $\alpha$ of intersection between the slanted surfaces 37a, 38a, 40a and 41a and a plane PL perpendicular to the clutch central axis is set to a range from 80 degrees to 85 degrees based on experiments conducted.

The assistive cam 26 and the slipper cam 27 are made of the same material and identical in shape. The first teeth 38 of the assistive cam 26 and the second teeth 41 of the slipper cam 27 are identical in shape. The first recesses 37 defined in the one side of the flange 25a of the central cam 25 and the second recesses 40 defined in the other side of the flange 25b are also identical in shape.

In other words, the angle of intersection between the slanted surfaces 37a and 38a of the assistive cam mechanism 23 and the plane PL and the angle of intersection between the slanted surfaces 40a and 41a of the back torque limiter mechanism 24 and the plane PL are identical to each other. Rear side surfaces of the first recesses 37 and the first teeth 38 along the rotating direction 39 of the clutch inner member 18 at the time the power is transmitted from the primary driven gear 16 to the main shaft 11 through the multiplate clutch 14 which is connected serve as slanted surfaces 37b and 38b, and front side surfaces of the second recesses 40 and the second teeth 41 along the rotating direction 42 of the central cam 25 at the time the back torque is transmitted serve as slanted surfaces 40b and 41b. The angle of intersection between these slanted surfaces 37b, 38b, 40b and 41b and the plane PL is identical to the angle of intersection between these slanted surfaces 37a, 38a, 40a and 41a and the plane PL.

Of the surrounding walls of the first recesses 37, the first walls 56 and the second walls 57 that are particular walls on which the slanted surfaces 37a and 37b are provided are raised from surfaces surrounding the walls 56 and 57. In the present embodiment, the first and second walls 56 and 57 are raised axially toward the assistive cam 26 from the ring portion 25ba serving as a wall which provides inner ends of the first recesses 37 along the radial direction of the central cam 25.

The one side of the flange 25b of the central cam 25 has cavities 54 disposed between the first walls 56 of the first recesses 37 and the third walls 58 of the second recesses 40 and cavities 55 disposed between the second walls 57 of the first recesses 37 and the fourth walls 59 of the second recesses 40. One side of the flat plate 25bb which provides closed ends of the cavities 54, 55 along the axial direction of the central cam 25 is of an arcuate shape which is concave away from the assistive cam 26.

As shown in FIG. 1, a collar member 43 interposed between the assistive cam 26 and the slipper cam 27 in surrounding relation to the flange 25b of the central cam 25 has an outer circumferential surface splined to the inner circumferential surface of the hollow cylindrical portion 18a of the clutch inner member 18 in a manner to define a minimum distance between the assistive cam 26 and the slipper cam 27.

The multiplate clutch 14 is covered with an engine cover 44 of the engine. An actuating shaft 45 has an end axially movably fitted in the engine cover 44 and an opposite end coaxially and slidably fitted in the main shaft 11. The actuating shaft 45 has an intermediate portion to which a bearing holder 46 is secured. A clutch bearing 47 is interposed between the bearing holder 46 and a lifter 48. The lifter 48 has an outer circumferential portion fitted in an end of the hollow cylindrical portion 18a of the clutch inner member 18. A retaining ring 49 which is held against the outer circumferential portion of the lifter 48 remotely from the clutch spring 22 is mounted in the end of the hollow cylindrical portion 18a.

An operating shaft 50 for selectively connecting and disconnecting the multiplate clutch 14 is angularly movably supported in the engine cover 44. The operating shaft 50 has an end projecting from the engine cover 44 and having a lever 51. A transmitting shaft 52 which is axially movable in response to angular movement of the operating shaft 50 has an end engaging an inner end of the operating shaft 50 and an opposite end coaxially coupled to the actuating shaft 45.

Operation of the present embodiment will be described below. Since the angle α of intersection between the slanted surfaces 37a and 38a of at least one of the groups of the abutting surfaces of the first recesses 37 and the second teeth 38, i.e., both of the abutting surfaces of the first recesses 37 and the second teeth 38 in the present embodiment, and the plane perpendicular to the clutch central axis is set to a range from 80 degrees to 85 degrees, the multiplate clutch 14 is capable of making the startability of the vehicle and the assistive effect compatible with each other.

The startability of the vehicle and the load with which to operate the clutch based on the assistive cam mechanism 23 were evaluated with different values of the angle α of intersection. Table 1 shows the results of the evaluation. In Table 1, judgement level A represents excellent, B good, C acceptable, and D unacceptable.

TABLE 1

| ANGLE OF INTERSECTION | EVALUATION | JUDGEMENT LEVEL |
|---|---|---|
| | STARTABILITY | |
| 69° | When clutch is to be connected, assisstive force is generated rapidly. Therefore, clutch is connected abruptly, impairing operability of clutch. | D |
| 75° | ↑ | D |
| 80° | Assistive force is reduced to about 45 to 60% of assistive force with angle of intersection in the range from 69 to 75°, and clutch is connected not abruptly. Since reactive force at the time clutch is connected is clearly transmitted due to cam thrust force, operability of clutch is increased when clutch is connected. | A |
| 85° | Though not as effective as with 80°, assistive force is reduced and clutch is connected not abruptly compared with 69°. | B |
| 86° | Same as with 85°. | B |
| | CLUTCH OPERATING LOAD | |
| 69° | Since assistive force is large, assisstive effect on clutch load is large. Clutch spring load can greatly be reduced. | A |
| 75° | Though not as effective as with 69°, it largely contributes to reducing clutch spring load. | A |
| 80° | Assistive force is about half assistive force with above angles as described above. Clutch spring load can be reduced though not much. However, operating load can sufficiently be reduced. | B |
| 85° | Assistive force is generated in allowable range effective to reduce clutch operating load. | C |
| 86° | No effective assistive force is produced. | D |

If the angle range with judgement level D in Table 1 is rejected, then the angle α of intersection is in the range from 80 degrees to 85 degrees. It has been confirmed that if the angle α of intersection is smaller than 80 degrees, then the pressing force generated by the assistive cam mechanism 23 for connecting the clutch becomes excessive to connect the clutch abruptly, adversely affecting the startability of the vehicle, and if the angle α of intersection is greater than 85 degrees, then no effective pressing force is generated, and the ability of the assistive cam mechanism 23 to reduce the clutch operating load is reduced. In the multiplate clutch 14 with the assistive cam mechanism 23, the angle of intersection between the slanted surfaces 37a and 38a of the assistive cam mechanism 23 and the plane perpendicular to the clutch central axis is set to a range from 80 degrees to 85 degrees to produce an effective assistive force while satisfying the startability. Compared with the background art which has required a considerable period of time to set an optimum angle, it is possible to achieve an optimum angle through a test for various requirements in a reduced period and reduce the number of design man-hours.

Figure 7:
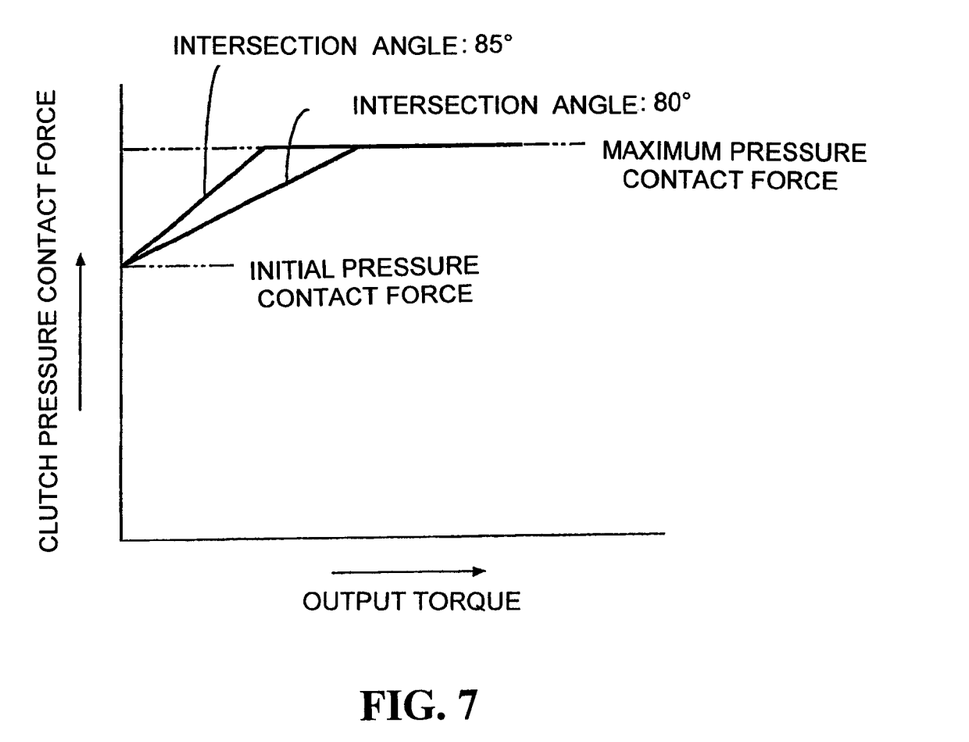
FIG. 7 is a diagram showing a change in a clutch pressing force depending on the angle of intersection between a slanted surface and a plane perpendicular to the central axis of the clutch.

When the angle of intersection between the slanted surfaces 37a and 38a of the assistive cam mechanism 23 and the plane perpendicular to the clutch central axis is set to 80 degrees and 85 degrees, the clutch pressing force changes as shown in FIG. 7. An appropriate assistive force can thus be obtained by setting the angle of intersection to a range from 80 degrees to 85 degrees.

Of the walls around the first recesses 37 defined in the one side of the central cam 25, the particular walls 56 and 57 with the slanted surfaces 37a and 37b thereon are raised from surfaces surrounding the particular walls 56 and 57. Therefore, the slanted surfaces 37a and 37b maintain required areas while at the same time the central cam 25 is reduced in weight. Furthermore, since the cavities 54 and 55 disposed between the first recesses 37 and the second recesses 40 are defined in the one side of the central cam 25, the central cam 25 is further reduced in weight.

The multiplate clutch 14 has the back torque limiter mechanism 24 for reducing the urging force of the clutch spring 22 upon an increase in a back torque in the back torque transmitting state for transmitting the back torque from the main shaft 11 to the primary driven gear 16. The back torque limiter mechanism 24 has the central cam 25 with the second recesses 40 and the slipper cam 27 with the second teeth 41 inserted in the second recesses 40. In the back torque transmitting state, at least one of the groups of the abutting surfaces of the second recesses 40 and the second teeth 41, i.e., both the abutting surfaces of the second recesses 40 and the second teeth 41 in the present embodiment, serve as the slanted surfaces 40a and 41a for reducing the urging force of the clutch spring 22 upon an increase in a back torque. As the angle of intersection between the slanted surfaces 40a and 41a and the plane perpendicular to the clutch central axis is identical to the angle $\alpha$ of intersection of the slanted surfaces 37a and 38a of the assistive cam mechanism 23, the assistive cam mechanism 23 and the back torque limiter mechanism 24 can share components. Therefore, dedicated components can be reduced for a reduction in the cost.

In particular, since the central cam 25 is shared by the assistive cam mechanism 23 and the back torque limiter mechanism 24 and the assistive cam 26 and the slipper cam 27 are made of the same material and identical in shape, the number of components can be reduced.

The multiplate clutch 14 is of the wet type. The first and second recesses 37 and 40 have open outer ends in the radial directions of the central cam 25. Since lubricating oil can thus be well discharged from the first and second recesses 37 and 40, the assistive cam mechanism 23 and the back torque limiter mechanism 24 are prevented from being adversely affected in operation by any excessive lubricating oil remaining in the first and second recesses 37 and 40.

Since at least one of the groups of the first and second recesses 37 and 40 defined in the central cam 25 i.e., both of the first and the second recesses 37 and 40 in the present embodiment, are disposed at equal spaced intervals in the circumferential directions of the central cam 25, forces generated when the assistive cam 26 and the slipper cam 27 are brought into abutment are distributed equally circumferentially by the central cam 25, allowing the assistive cam mechanism 23 and the back torque limiter mechanism 24 to operate reliably.

The single central cam 25 which is shared by the assistive cam mechanism 23 and the back torque limiter mechanism 24 is fixed to the main shaft 11, resulting in a reduction in the number of components and a reduced space in which the assistive cam mechanism 23 and the back torque limiter mechanism 24 are disposed. Moreover, since the first recesses 37 and the second recesses 40 are defined in the central cam 25 at the same position in the axial directions of the main shaft 11, the space along the axial directions of the main shaft 11 for placing the first and second recesses 37 and 40 therein is reduced, making the assistive cam mechanism 23 and the back torque limiter mechanism 24 compact.

The central cam 25 has the hollow cylindrical boss 25a fixed to the main shaft 11 and the flange 25b integral with the boss 25a and extending radially outwardly from the axially intermediate portion of the boss 25a, and the flat plate 25bb which serves as part of the flange 25b and extends along the plane perpendicular to the axis of the main shaft 11 is joined to the open ends of the second recesses 40. Consequently, the open ends of the second recesses 40 which serve as part of the back torque limiter mechanism 24 on which relatively large forces are applied are reinforced by the flat plate 25bb.

The first recesses 37 are defined between the first and second walls 56 and 57 projecting from the one side of the flat plate 25bb. The second recesses 40 are defined by the third and fourth walls 58 and 59 projecting from the one side of the flat plate 25bb and the joint walls 60 integrally joining the projecting ends of the third and fourth walls 58 and 59. One side of the flat plate 25bb is of an arcuately concave shape between the first and third walls 56 and 58 and between the second and fourth walls 57, 59. Accordingly, joints between the first through fourth walls 56 through 59 which provide the circumferentially opposite sides of the first recesses 37 and the second recesses 40 and the flat plate 25bb can be curved and thick, and hence of increased mechanical strength.

The present embodiment has been described above. However, the present invention is not limited to the above embodiment. Various design changes may be made therein without departing from the invention as described in the scope of claims for patent.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A multiplate clutch, comprising:
   a clutch outer member coupled to an input member,
   a clutch inner member coupled to an output member,
   a plurality of drive friction plates engaging said clutch outer member,
   a plurality of driven friction plates alternately superposed on said plurality of drive friction plates and engaging said clutch inner member,
   a sandwiching presser plate sandwiching said plurality of drive friction plates and said plurality of driven friction plates between said sandwiching pressure plate and said clutch inner member,
   a clutch spring which urges said clutch inner member or said sandwiching presser plate in a direction to sandwich said plurality of drive friction plates and said plurality of driven friction plates under pressure between said clutch inner member and said sandwiching presser plate, and an assistive cam mechanism including a first cam member having a first recess and a second cam member having a first tooth inserted in said first recess, wherein at least one of abutment surfaces of said first recess and said first tooth, in a power transmitting state for transmitting power from said input member to said output member, includes a first slanted surface formed such that an urging force of said clutch spring can be increased upon acceleration in said power transmitting state, and wherein an angle of intersection between said first slanted surface and a plane perpendicular to a clutch central axis is set to a range from 80 degrees to 85 degrees.

2. The multiplate clutch according to claim 1, wherein said first slanted surface is formed on at least one wall surrounding said first recess, said at least one wall being raised from a surface surrounding said at least one wall.

3. The multiplate clutch according to claim 2, further comprising a back torque limiter mechanism including a third cam member having a second recess and a fourth cam member having a second tooth inserted in said second recess, wherein at least one of abutting surfaces of said second recess and said second tooth includes a second slanted surface for reducing the urging force of said clutch spring upon an increase in a back torque in a back torque transmitting state for transmitting the back torque from said output member to said input member, and wherein an angle of intersection between said second slanted surface and the plane perpendicular to the clutch central axis is identical to said angle of intersection of said first slanted surface and the plane perpendicular to the clutch central axis.

4. The multiplate clutch according to claim 3,
wherein said multiplate clutch is a wet multiplate clutch, and
wherein said first and second recesses have open outer ends along radial directions of said first and third cam members.

5. The multiplate clutch according to claim 3,
wherein said first and third cam members are coaxially fixed to said output member, and
wherein at least one of said first and second recesses are disposed at equal spaced intervals in circumferential directions of said first and third cam members.

6. The multiplate clutch according to claim 3,
wherein said first and third cam members are formed as a single central cam fixed to said output member, and
wherein the first recess, which is open on a first side of said central cam, in an axial direction of said output member, and the second recess, which is open on a second side of said central cam, in the axial direction of said output member, are defined in said central cam at the same position in said axial direction.

7. The multiplate clutch according to claim 6,
wherein said central cam has a hollow cylindrical boss fixed to said output member and a flange integral with said hollow cylindrical boss and extending radially outwardly from an axially intermediate portion of the boss, and
wherein said flange includes a portion as a flat plate extending along a plane perpendicular to an axis of said output member, said flat plate being joined to open ends of a plurality of said second recesses.

8. The multiplate clutch according to claim 7,
wherein said first recess is defined between first and second walls projecting from a first side of said flat plate,
wherein said second recess is defined by third and fourth walls projecting from a second side of said flat plate and a joint wall integrally joining projecting ends of the third and fourth walls, and
wherein the second side of said flat plate is arcuately concave between the first and third walls and between the second and fourth walls.

9. The multiplate clutch according to claim 2,
wherein said multiplate clutch is a wet multiplate clutch.

10. The multiplate clutch according to claim 1, further comprising a back torque limiter mechanism including a third cam member having a second recess and a fourth cam member having a second tooth inserted in said second recess, wherein at least one of abutting surfaces of said second recess and said second tooth includes a second slanted surface for reducing the urging force of said clutch spring upon an increase in a back torque in a back torque transmitting state for transmitting the back torque from said output member to said input member, and wherein an angle of intersection between said second slanted surface and the plane perpendicular to the clutch central axis is identical to said angle of intersection of said first slanted surface and the plane perpendicular to the clutch central axis.

11. The multiplate clutch according to claim 10,
wherein said multiplate clutch is a wet multiplate clutch, and
wherein said first and second recesses have open outer ends along radial directions of said first and third cam members.

12. The multiplate clutch according to claim 11,
wherein said first and third cam members are formed as a single central cam fixed to said output member, and
wherein the first recess, which is open on a first side of said central cam, in the axial direction of said output member, and the second recess, which is open on a second side of said central cam, in an axial direction of said output member, are defined in said central cam at the same position in said axial direction.

13. The multiplate clutch according to claim 12,
wherein said central cam has a hollow cylindrical boss fixed to said output member and a flange integral with said hollow cylindrical boss and extending radially outwardly from an axially intermediate portion of the boss, and
wherein said flange includes a portion as a flat plate extending along a plane perpendicular to an axis of said output member, said flat plate being joined to open ends of a plurality of said second recesses.

14. The multiplate clutch according to claim 10,
wherein said first and third cam members are coaxially fixed to said output member, and
wherein at least one of said first and second recesses are disposed at equal spaced intervals in circumferential directions of said first and third cam members.

15. The multiplate clutch according to claim 10,
wherein said first and third cam members are formed as a single central cam fixed to said output member, and
wherein the first recess, which is open on a first side of said central cam, in an axial direction of said output member, and the second recess, which is open on a second side of said central cam, in the axial direction of said output member, are defined in said central cam at the same position in said axial direction.

16. The multiplate clutch according to claim 15,
wherein said central cam has a hollow cylindrical boss fixed to said output member and a flange integral with said hollow cylindrical boss and extending radially outwardly from an axially intermediate portion of the boss, and
wherein said flange includes a portion as a flat plate extending along a plane perpendicular to an axis of said output member, said flat plate being joined to open ends of a plurality of said second recesses.

17. The multiplate clutch according to claim 16,
wherein said first recess is defined between first and second walls projecting from a first side of said flat plate,
wherein said second recess is defined by third and fourth walls projecting from a second side of said flat plate and a joint wall integrally joining projecting ends of the third and fourth walls, and
wherein the second side of said flat plate is arcuately concave between the first and third walls and between the second and fourth walls.

\* \* \* \* \*